3,479,295
METHOD OF REDUCING A RADIOACTIVE
WASTE SOLUTION TO DRYNESS
Thomas K. Thompson, Idaho Falls, Idaho, assignor to the United States of America as represented by the United States Atomic Energy Commission
Filed Sept. 22, 1967, Ser. No. 669,956
Int. Cl. F26b 11/00
U.S. Cl. 252—301.1                 4 Claims

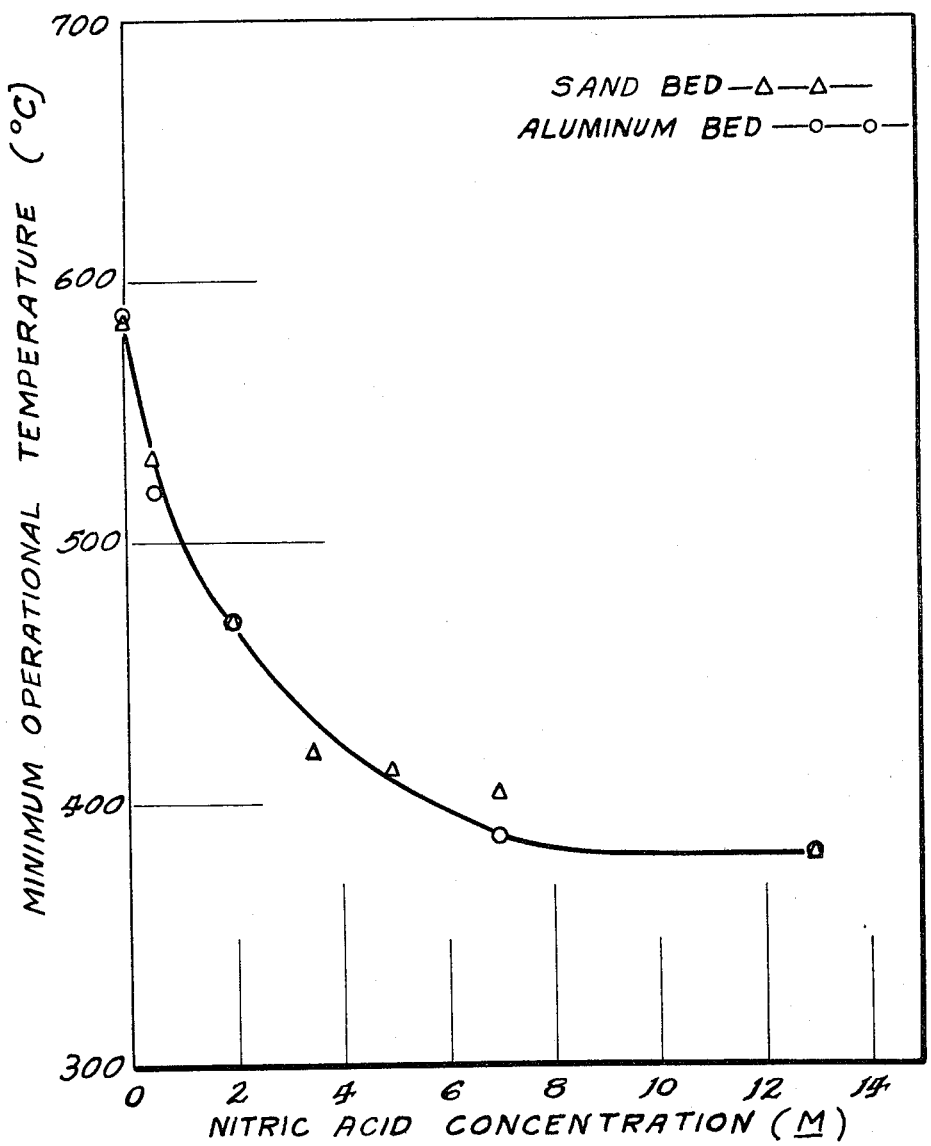

ABSTRACT OF THE DISCLOSURE

A method of reducing a radioactive waste solution to dryness comprising evaporating the solution and calcining the resulting solids in a fluidized bed wherein the fluidized bed is heated by burning a hydrocarbon fuel in the bed in the presence of nitrate ion.

CONTRACTUAL ORIGIN OF THE INVENTION

The invention described herein was made in the course of, or under, a contract with the United States Atomic Energy Commission.

BACKGROUND OF THE INVENTION

This invention relates to a method of reducing a solution or slurry to dryness. In more detail the invention relates to a method of evaporating and calcining a radioactive waste solution containing aluminum nitrate. It will be appreciated that the invention relates to both solutions and slurries but for simplicity the term solution will be used hereinafter to cover both solutions and slurries.

Disposal of waste solutions and particularly disposal of radioactive waste solutions obtained in the processing of nuclear fuel is a serious problem and many approaches have been suggested for solving this problem. One of the most promising approaches and one on which a considerable body of effort has been expended is to use a fluidized bed to reduce the solution to dryness for disposal. A Waste Calcining Facility has been placed into operation at the National Reactor Testing Station, Arco, Idaho, to explore the use of a fluidized bed for this purpose. U.S.A.E.C. Report IDO–14620 (1963), entitled "ICPP Waste Calcining Facility Safety Analysis Report," describes this facility in detail and IDO–14662 (1966), describes operation of the facility. The calciner is heated by heating elements carrying NaK disposed in the bed.

A different procedure for heating a fluidized bed has been suggested. This involves burning a hydrocarbon fuel in the fluidized bed. Although this procedure has been found effective in a number of instances, application to a radioactive waste solution has not been attempted in the past because radioactive waste solutions normally contain a high proportion of nitrate ions and it was believed that the danger from an explosion from mixing a hydrocarbon fuel and a hot nitrate solution was too great to make the procedure practical. However, use of in-bed burning would permit greater throughput rates and eliminate the hazards associated with the NaK system.

SUMMARY OF THE INVENTION

Surprisingly, I have found not only that it is possible to provide the heat necessary for evaporation and calcination of a radioactive waste solution containing nitrates in a fluidized bed by burning a hydrocarbon fuel in the bed but also that the temperature of stable burning of the fuel is lower when the nitrates are present than when they are not. Thus it is possible to add nitrate ion to a feed containing no nitrate ion to reduce the temperature of stable burning. By stable burning is meant a condition in which burning continues under equilibrium conditions and also in which burning occurs in the bed rather than above the bed. The minimum operational bed temperature is defined as the point at which the bed and vapor space temperatures are identical. Bed operating temperatures lower than the minimum operational temperature result in burning above the fluidized bed which is indicated by vapor space temperature being greater than the bed temperature. Above-bed burning is undesirable because it wastes heat.

BRIEF DESCRIPTION OF THE DRAWING

The sole figure of the drawing is a graph showing the dependence of the minimum stable combustion temperature on nitric acid concentrations for a kerosene fuel burned within a fluidized bed.

DESCRIPTION OF THE PREFERRED EMBODIMENT

A pilot plant waste calciner was employed to demonstrate the invention. A solution simulating a waste stream obtained in the processing of aluminum-clad nuclear fuel elements and a slurry simulating a waste stream obtained in the processing of zirconium-clad nuclear fuel elements were prepared. Their composition follows:

I

| | | |
|---|---|---|
| Al | M__ | 1.43 |
| $H^+$ | N__ | 1.18 |
| $NO_3^-$ | M__ | 5.24 |
| Cr | g./l__ | 0.36 |
| B | M__ | .049 |
| Hg | g./l__ | .616 |
| Average Sp. Gr. | | 1.256 |
| Total solids | g./l__ | 81.88 |
| Undissolved solids | g./l__ | 0.206 |

II

Solution composition:

| | | |
|---|---|---|
| Al | M__ | 0.326 |
| $H^+$ | N__ | 0.83 |
| Zr | M__ | 0.09 |
| $F^-$ | mg./l__ | 14.45 |
| $NO_3^-$ | M__ | 3.34 |
| Ca | g./l__ | 37.78 |
| Cr | g./l__ | 0.49 |
| Hg | g./l__ | 0.62 |
| B | g./l__ | 1.19 |

Solid composition:

| | | |
|---|---|---|
| Zr | wt. percent__ | 23.9 |
| Ca | do____ | 21.2 |
| $F^-$ | do____ | 31.4 |
| Specific gravity | | 1.20 |
| Total solids | g./l__ | 131.7 |
| Undissolved solids | g./l__ | 61.6 |

The following table gives the operating parameters:

| | | |
|---|---|---|
| Diameter of fluidizing chamber | inches__ | 12 |
| Bed height | do____ | 30–35 |
| Average mass median particle sie of bed | mm__ | .4 |
| Kerosene feed rate | gal./hr__ | 0.88 |
| Total air | std. cu. ft./min__ | 19.5 |
| Oxygen | std. cu. ft./min__ | 10 |
| Test pressure | p.s.i.a__ | 15.5 |
| Feed rate | liters/hr__ | 7–20 |

Each simulated waste material was run for five days while varying the feed rate to vary the thermal load to the process and thus vary the temperature. Both the simulated waste and the kerosene were fed into the bed through a pneumatic atomizing spray nozzle. Operation of the calciner with the aluminum-containing solution was carried out at 480° C. and the temperature of operation for the zirconium-containing slurry was 510° C. These were feasibility tests and no attempt was made to determine the minimum stable operating temperature.

While little has been reported on the minimum operating temperatures of fluidized beds using in-bed combustion of a fuel as the heat source, several references have been found which report a much higher temperature as the minimum temperature. The Russian investigators, Karchenko and Makhorin, reported that the minimum temperature for stable combustion of a premixed natural gas-air mixture in a fluidized bed was 800–849° C. The complete reference is:

Karchenko, N. V., and K. E. Makhorin, "The Rate of Heat Transfer Between a Fluidized Bed and an Immersed Body at High Temperatures," International Chemical Engineering, vol. 4, No. 4, pp. 650–654 (October 1964).

The references listed below mention a fluidized bed process for calcining limestone that utilizes the in-bed combustion of bunker C fuel oil at temperatures of 1450–1800° F. (788–982° C.). However, the minimum temperatures reported are probably dependent on the reaction converting limestone to lime, and are not the minimum temperatures associated with the in-bed burning of the fuel oil. The complete references are:

Kite, R. P., and E. J. Roberts, "Fluidization in Non-Catalytic Operations," Chemical Engineering, pp. 112–115 (December 1947), and Shafer, M., and M. W. Brandt, "Hot Cyclone Development Improves Lime Yield," Chemical Engineering Progress, vol. 59, No. 11, pp. 95–99 (November 1963).

Gossom and Stevens report operating temperatures of 649–871° C. (1200–1600° F.) for the incineration of refinery wastes in a fluidized bed incinerator. The waste is burned directly in the fluidized bed and provides the necessary heat for the process. The complete reference is:

Gossom, W. J., and J. I. Stevens, "The Near Ultimate Disposal of Refinery Wastes," a paper (Tech. 65–42) presented at the Rocky Mountain Regional Meeting, National Petroleum Refiners Association, Casper, Wyo. (Sept. 28–30, 1965).

In order to determine whether the effect observed is due to the presence of nitrate ion or could be due to the material in the fluidized bed, a series of tests were run using a feed containing nothing but water and nitric acid to a fluidized bed of sand or of aluminum oxide. Test conditions were the same as those in the pilot plant studies described above. Results are given in the drawing. It is thus clear that the nitrate ion is responsible for the reduction in the temperature of stable operation and that this temperature can easily be reduced below 500° C. This is important since in the Waste Calcining Facility it is desirable to calcine at 400 to 500° C. Operation at as low a temperature as possible is desirable since it minimizes heat loss in the form of sensible heat of the effluent stream and heat lost from the equipment itself.

It will be observed that about 30% oxygen was employed in the fluidizing gas. The use of extra oxygen is not necessarily a requirement to achieve in-bed combustion in a fluidized bed. However, to attain combustion with air alone, a high fluidizing velocity is necessary to provide sufficient oxygen for in-bed combustion. In the waste calcining process the bed is composed of relatively small diameter particles and elutriation would occur if the fluidizing velocity were sufficiently high to attain combustion using air alone. The use of about 30% oxygen reduces the required fluidizing velocity sufficiently so that there is no danger of elutriation occurring.

At startup, the original fluidized bed must be preheated by some appropriate means to the ignition temperature before fuel for combustion is injected. This preheat can be provided by hot fluidizing gases, by special LPG burners in the bed, by electrical heaters, by heat exchange bundles or jackets, or by more sophisticated means such as induction heating of metallic particles.

Explosion hazards can be minimized by preventing fuel injection when the bed temperature is below the spontaneous ignition temperature of the fuel. When the bed cools significantly, as in the case of an extended power outage, it must be preheated to the appropriate temperature before fuel injection is begun. Flameout can be avoided by operating above the spontaneous ignition temperature. Automatic interlocks should be used to stop feed and fuel flows in the event of temperature reductions below preset limits. In none of the testing to date has there been any indication of combustion instability which would lead to explosion.

While kerosene was used in the reported tests, other hydrocarbon fuels such as diesel oil can also be used. It appears from the tests that fuel selection can be based essentially on economics.

It will be understood that the invention is not to be limited to the details given herein but that it may be modified within the scope of the appended claims.

The embodiments of the invention in which an exclusive property or privilege is claimed are defined as follows.

I claim:

1. In a method of reducing a radioactive waste solution obtained in the processing of nuclear fuel elements to dryness wherein a fluidizing gas containing oxygen is passed upwardly through a bed of particles formed by calcination of the salts in the waste solution and the waste solution is fed into the fluidized bed so formed, the improvement comprising introducing a hydrocarbon fuel into the fluidized bed in the presence of nitrate ions at a temperature above the ignition temperature of the fuel and burning the fuel to provide the heat necessary to evaporate the solution and calcine the salts contained therein.

2. The improvement of claim 1 wherein the waste solution contains a high proportion of nitrates.

3. The improvement of claim 1 wherein nitrates are added to the waste solution to lower the minimum temperature of stable burning.

4. The improvement of claim 1 wherein the fluidizing gas contains about 30% oxygen.

References Cited

UNITED STATES PATENTS

| | | | |
|---|---|---|---|
| 3,101,258 | 8/1963 | Johnson. | |
| 3,116,131 | 12/1963 | Beerman | 252—301.1 |
| 3,191,662 | 6/1965 | Schneider | 252—301.1 X |
| 3,305,320 | 2/1967 | Weech | 252—301.1 X |

CARL D. QUARFORTH, Primary Examiner

STEPHEN J. LECHERT, Assistant Examiner